3,822,293
PROCESS FOR THE PREPARATION OF 3-(3'-CARBO-ALKOXY - 4' - ACETOXY - 1'-NAPHTHYL)-3-(4"-HYDROXY-1"-NAPHTHYL)NAPHTHALIDE

Henry Bader, Newton Center, Michael H. Feingold, Pinehurst, Susan C. January, Wellesley Hills, and John W. Sparks, Boston, Mass., assignors to Polaroid Corporation, Cambridge, Mass.
No Drawing. Continuation-in-part of abandoned application Ser. No. 293,036, Sept. 28, 1972. This application Dec. 1, 1972, Ser. No. 311,681
Int. Cl. C07d 7/00
U.S. Cl. 260—343.2 R         10 Claims

ABSTRACT OF THE DISCLOSURE

This invention relates to an improved method of synthesizing certain 1-naphthol naphthalides by conducting the reaction of a 3-acetoxy-3-(4'-acetoxy-1'-naphthyl)naphthalide and a 1-naphthol in acetonitrile and a lower boiling co-solvent, removing substantially all of the co-solvent and isolating and purifying the condensation product prior to converting the condensation product to the naphthalide dye product.

BACKGROUND OF THE INVENTION

Cross Reference to Related Applications

This Application is a continuation-in-part of U.S. Patent Application Ser. No. 293,036 filed Sept. 28, 1972, now abandoned.

1. Field of the invention

This invention relates to an improved method of preparing indicator dyes and, in particular, to an improved method of synthesizing 1-naphthol naphthalides.

2. Background of the invention

A particularly useful method of preparing 1-naphthol naphthalides forms the subject matter of copending U.S. patent application Ser. No. 311,682 of Efthimios Chinoporos and Paul S. Huyffer filed Dec. 1, 1972, in part a continuation of Ser. No. 216,254 filed Jan. 7, 1972, now abandoned. According to the method disclosed and claimed therein, 1-naphthol naphthalides are prepared by condensing a 1-naphthol and a diacetate of a naphthalidylnaphthol oxidation product. More particularly, the method comprises:

(A) reacting a solution of (a) a 3-acetoxy-3-(4'-acetoxy-1'-naphthyl)naphthalide and (b) a 1-naphthol in inert organic media at elevated temperature to form the corresponding 3 - (4'-acetoxy-1'-naphthyl)-3-(4'-hydroxy-1'-naphthyl)naphthalide; and (B) converting said 4'-acetoxy group to a hydroxy group to form the corresponding 3,3-disubstituted naphthalide where said 3,3 substituents are 4'-hydroxy-1'-naphthyl radicals, the same or different.

In a preferred embodiment, 1-naphthol naphthalides wherein one and preferably both of the 4-hydroxy-1-naphthyl radicals contain a carboxy substituent are prepared employing as the diacetate intermediate for reaction with the 1-naphthol, a 3-acetoxy-3-(3'-COOR-4'-acetoxy-1'-naphthyl)naphthalide, wherein R is hydrogen or alkyl, preferably lower alkyl, for example, as illustrated in the following reaction scheme.

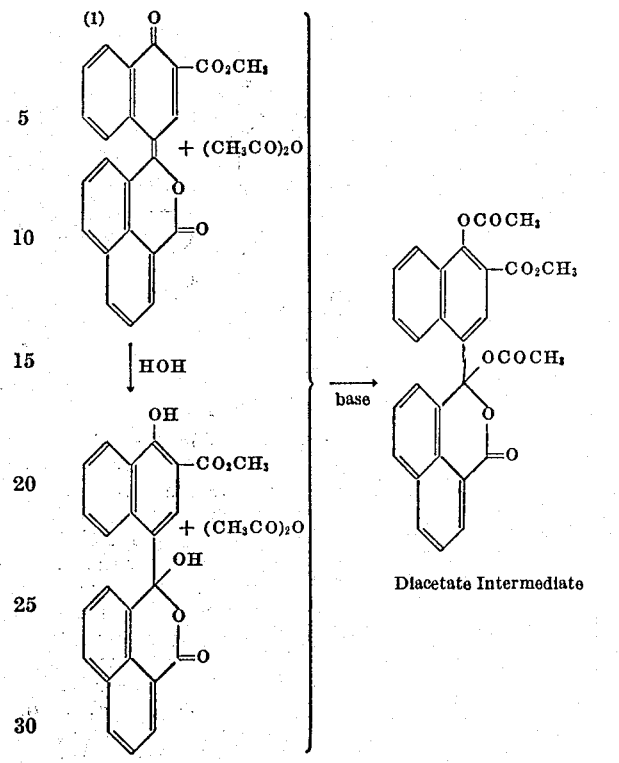

Diacetate Intermediate

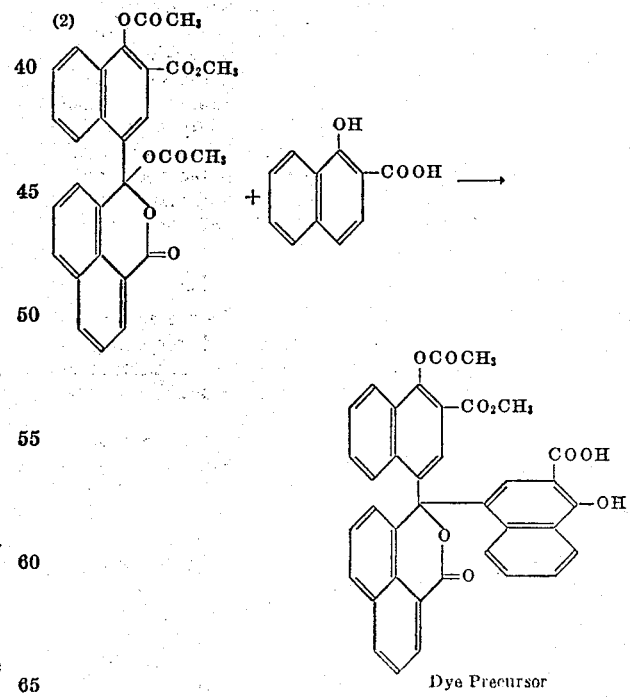

Dye Precursor

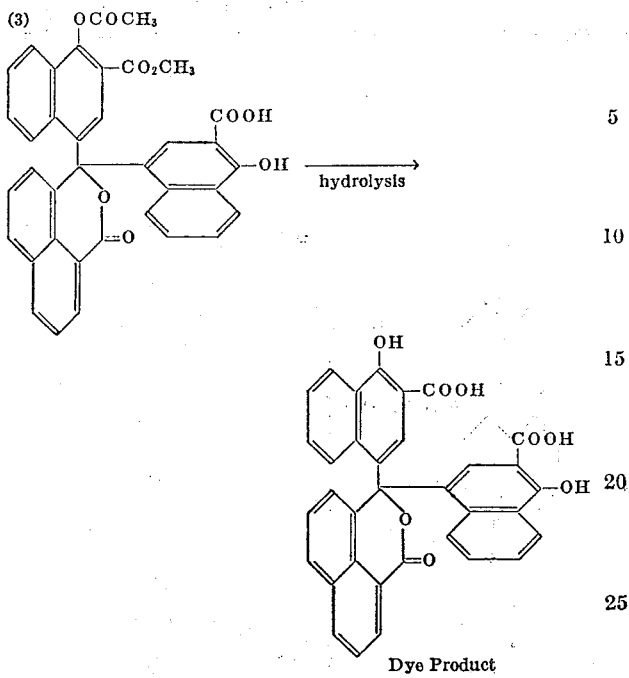

Dye Product

As discussed in this copending application, the indicator, i.e., pH-sensitive, dyes produced in accordance with the foregoing method may be employed in analytical procedures where phthalein indicators are commonly used, for example, to measure changes in pH value and find other uses as well. For example, it has been found that a selectively exposed photosensitive material having a latent image therein may be processed in the presence of extraneous incident radiation actinic thereto by reason of the protection afforded by suitably positioning with respect to the exposure surface of the photosensitive layer an effective concentration of a selected dye or dyes as optical filter agents. For use in photographic processes, it is preferred that the dye or dyes selected as the optical filter agent(s) are substantially nondiffusible and immobile in the photographic processing composition in order to achieve optimum efficiency as a radiation filter and to prevent diffusion of filter agent into layers of the film unit where its presence may be undesirable.

The present invention is concerned with an improvement in the above-described method of synthesizing 1-naphthol naphthalides and particularly those wherein one of the naphthol radicals contains an aliphatic substituent, such as, an alkoxy or alkyl radical containing up to about 20 carbon atoms for adjusting the mobility of the dye in a given photographic processing composition. Such dyes may be produced according to the subject improved method in substantially improved yields and may be more readily obtained in the high purity desired for their use in photographic processes.

SUMMARY OF THE INVENTION

It is, therefore, the primary object of the present invention to provide an improved method of preparing 1-naphthol naphthalides wherein one of the naphthol radicals contains an aliphatic substituent, especially a long chain substituent.

It is another object of the present invention to provide an improved synthesis for the production of these 1-naphthol naphthalides wherein both of the naphthol radicals possess a carboxy substituent adjacent to the functional hydroxy group, i.e., naphhtholic —OH.

Other objects of this invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

According to the present invention, an improved method is provided for synthesizing 1-naphthol naphthalides and particularly, carboxynaphthol naphthalides wherein one of the naphthol radicals contains an aliphatic substituent. This improved method comprises reacting the diacetate intermediate and the selected 1-naphthol containing an aliphatic substituent in a solution of acetonitrile and a lower boiling co-solvent, removing substantially all of the co-solvent and isolating the naphthalide dye precursor from the reaction medium and from substantially all impurities prior to converting the dye precursor to the naphthalide dye product.

For a fuller understanding of the nature and objects of the present invention, reference should be had to the following detailed description.

DESCRIPTION OF THE PREFERRED EMBODIMENTS

According to the present invention, it has been found that certain substituted naphthol naphthalides of analytical purity may be obtained in yields exceeding 60%, by weight, by modifying the method of aforementioned application Ser. No. 216,254 to conduct the condensation reaction of step (2) under certain specific conditions and then isolating and purifying the condensation product, i.e., the dye precursor, prior to hydrolysis step (3). Specifically, it has been found that higher conversions may be achieved in the condensation step and that substantially all of the dye precursor produced in the condensation step may be recovered from the reaction medium by conducting the condensation in a solution containing acetonitrile and a co-solvent that is an inert organic solvent for both the diacetate intermediate and the substituted 1-naphthol and which has a boiling point such that it may be rapidly removed from the reaction medium, e.g., by distillation. Also, it has been found that isolating the dye precursor from the reaction medium and from substantially all of the reaction by-products and unreacted 1-naphthol before hydrolyzing greatly facilitates the purification of the dye product. Because the reaction by-products are hydrolyzed together with the dye precursor, they are difficult to separate from the final dye when present in substantial amounts. By including a preliminary purification prior to hydrolysis, the dye product isolated after hydrolyzing is comparatively free from such impurities and may be readily purified, for example, by recrystallization from a suitable solvent to give a product having the desired high purity necessary for its use in certain applications, such as, the photographic use discussed above.

In carrying out the improved method of the present invention, naphthalide indicator dyes are prepared by:

(A) reacting by heating at reflux under substantially anhydrous conditions (a) 3-acetoxy-3-(3'-COOR-4'-acetoxy-1'-naphthyl) naphthalide wherein R is lower alkyl having 1 to 4 carbon atoms and preferably methyl, and (b) a 1-naphthol substituted with an aliphatic group to form the corresponding 3-(3'-COOR - 4' - acetoxy-1'-naphthyl)-3-(4''-hydroxy-1''-naphthyl)naphthalide dye precursor by heating said (a) and said (b) together in solution in acetonitrile and an inert organic liquid co-solvent having a boiling point not exceeding about 70° C. and simultaneously removing substantially all of said co-solvent;

(B) isolating said dye precursor from the cooled reaction solution;

(C) removing substantially all of the impurities from said dye precursor; and (D) hydrolyzing said dye precursor to form the corresponding 3-(3'-carboxy-4'-hydroxy-1'-naphthyl)-3-(4''-hydroxy-1'''-naphthyl)naphthalide dye product.

Though the method of the present invention may be used in the synthesis of 1-naphthol naphthalides, in general, it finds particular utility in the synthesis of indicator dyes as represented by the formula:

(I) 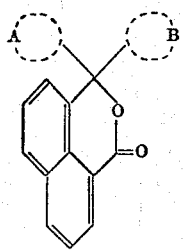

wherein A is 3'-carboxy-4'-hydroxy-1'-naphthyl and B is 4''-hydroxy-1''-naphthyl substituted with an aliphatic group containing up to 20 carbon atoms. In a preferred embodiment, the B radical also possesses a carboxy group in the 3''-position.

The aliphatic group, branched or straight chain, may be alkyl, such as methyl, ethyl, isopropyl, butyl, t-butyl, hexyl, dodecyl, octadecyl or eicosanyl; alkenyl, such as, 3-butenyl, 2-methyl-1,3-butadienyl, 2-hexenyl and 9-octadecenyl; alkoxy, such as, ethoxy, butoxy, 1-ethoxy-2-(β-ethoxyethoxy), hexyloxy, dodecyloxy, and octadecyloxy; and alkoxyalkyl, such as, methoxyethyl, methoxyethoxyethyl, butoxydodecyl and ethoxyethoxyhexadecyl. Also, the aliphatic group may be substituted with a solubilizing group, i.e., the alkyl, alkenyl, alkoxy and alkoxyalkyl groups enumerated above may be substituted with a solubilizing group, e.g., —OH, —COOH and —SO₃H.

Specific examples of 1-naphthol indicator dyes that may be prepared according to the method of the present invention are as follows:

(1) 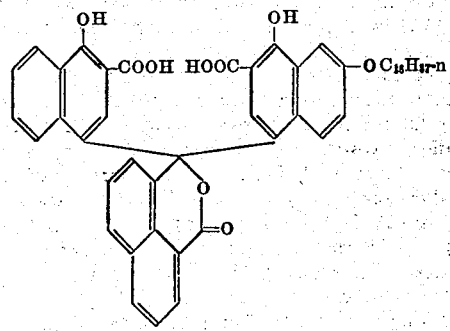

(2) 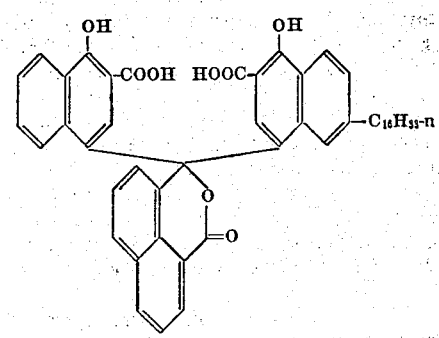

(3) 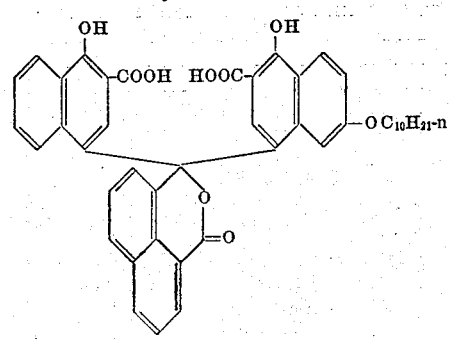

(4) 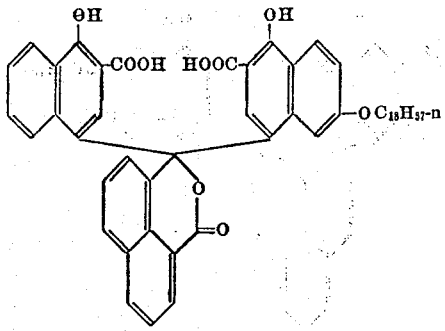

(5) 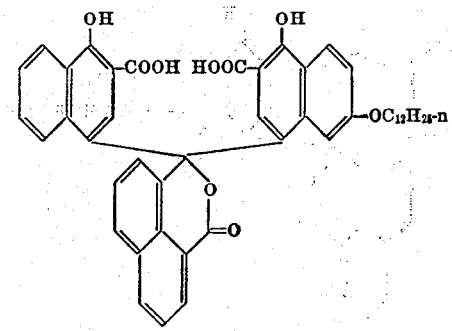

(6) 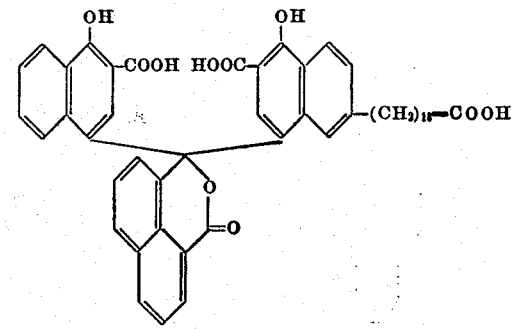

(7) 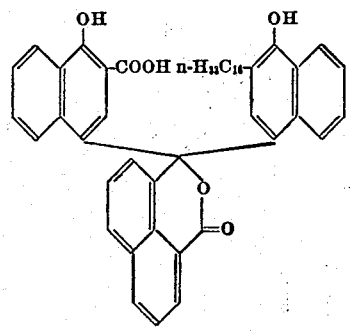

(8) 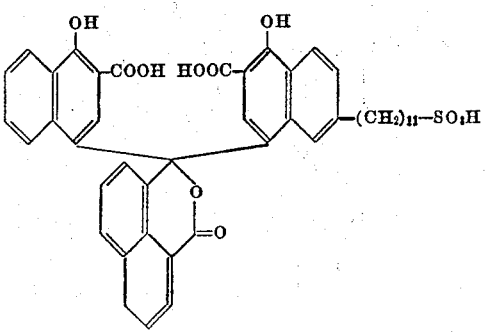

(9) 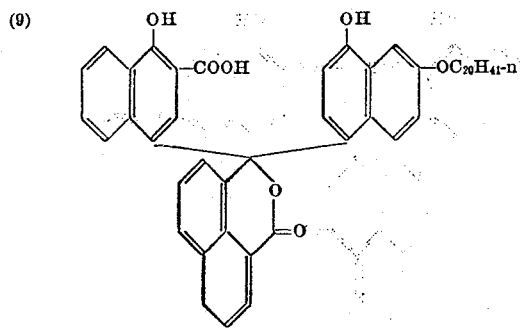

(10) 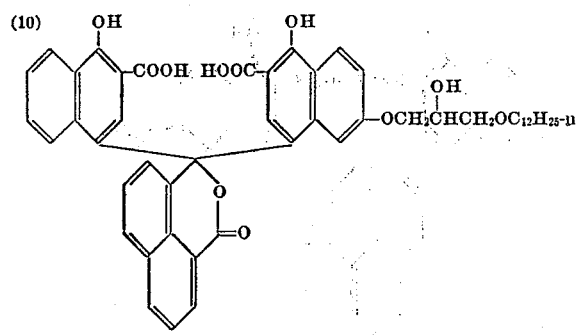

(11) 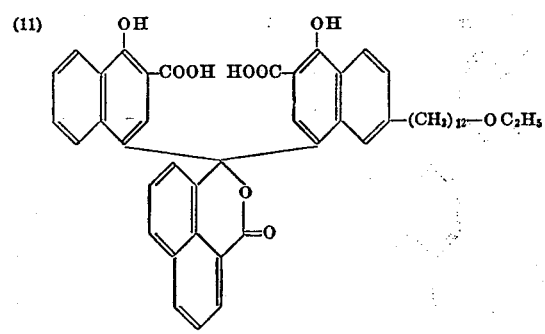

(12) 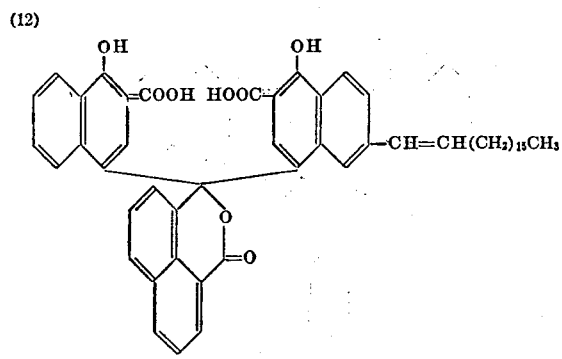

(13) 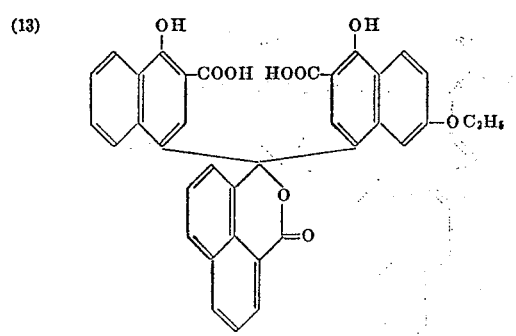

(14) 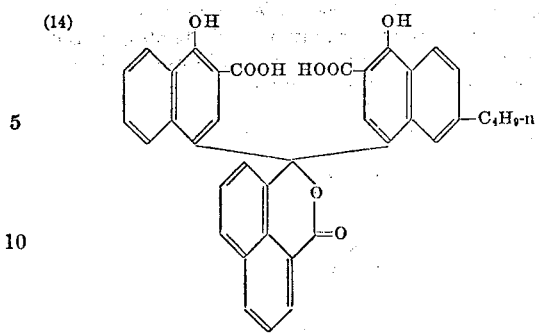

(15) 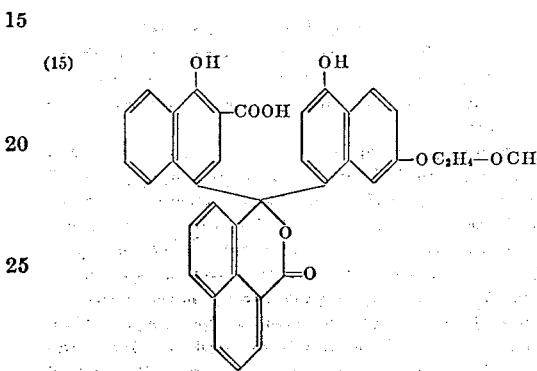

Of special interest for the purpose of the present invention are the indicator dyes exemplified by formulae (1) to (12) which contain a long chain aliphatic substituent. These long chains or "tails," which impart low mobility or immobility to the dye molecule are of particular interest in the photographic use of these dyes for adjusting their diffusibility in the photographic processing composition. However, the presence of a long aliphatic chain tends to cause difficulties in the synthesis of the indicator dye due chiefly to the solubility characteristics of the "tailed" 1-naphthol starting material and of the resulting condensation product, i.e., the dye precursor formed upon condensation of "tailed" 1-naphthol and diacetate intermediate.

In carrying out the condensation with "tailed" naphthols, a mixture of two solvents was usually employed, one being preferably acetonitrile and the other being a solvent for the long-chain substituted 1-napthol, such as, methyl ethyl ketone and 1,2-dimethoxyethane, as disclosed in aforementioned U.S. Patent Application Ser. No. 216,254. Subsequent work has demonstrated, however, that a co-solvent system adversely affects the conversion. The conversion increased when the amount of co-solvent was reduced. For example, with acetonitrile and 1,2-dimethoxyethane as co-solvent, the conversion into the dye of formula (4) was as follows:

| Conversion (percent by wt.) | Ratio (parts by vol.) acetonitrile:dimethoxyethane |
|---|---|
| 52.5 | 1:1 |
| 57.5 | 2:1 |
| 62.5 | 3:1 |
| 64.5 | 4:1 |

On the other hand, some co-solvent is necessary for the introduction of the "tailed" naphthol. Indeed, without a co-solvent, only a 59.7% conversion into the dye of formula (4) took place in acetonitrile alone.

Thus, co-solvent should be used, though in minor proportions, for the introduction of "tailed" naphthol which is insoluble or only slightly soluble in acetonitrile and then removed, as soon as possible, so that the bulk of the condensation reaction is carried out in acetonitrile as the largely dominant solvent. Accordingly, it is essential that the co-solvent selected for introducing the naphthol have a boiling point not exceeding about 70° C. In this way, a conversion of 70-75% into the dye of formula (4) was realized.

The removal of co-solvent during the condensation has an added advantage in that the dye precursor formed is very insoluble in acetonitrile alone and thus, crystallizes out with a high degree of selectivity from the reaction mixture, usually with a purity of 80-85% by weight. No such isolation of dye precursor can be achieved if co-solvents, such as, ethers or ketones, are present in an appreciable amount as would occur with higher boiling co-solvents of this type. The isolation of dye precursor and its purification prior to hydrolysis was a major step in achieving a high recovery of dye product. Hitherto, the reaction mixture containing the dye precursor and all of the by-products was evaporated to dryness. This mixture was then hydrolyzed without isolation and purification of the dye precursor, and the resulting hydrolyzate was crystallized or triturated with hot solvents to recover the dye product. The yields of dye product obtained in this manner were over 40% and usually in the neighborhood of 45% by weight, and the product was about 95-97% pure. According to the improved method of the present invention, however, the yields have been increased to over 60% and usually are in the vicinity of 65% by weight, and the dye product recovered is analytically pure (99-100% purity).

More particularly, in carrying out the method of the present invention in step (A), the diacetate intermediate is heated at reflux in a solution of acetonitrile, and a solution of the selected 1-naphthol in a co-solvent is slowly added. As noted above, the inert organic liquid selected as the co-solvent should have a boiling point (or boiling range) not exceeding about 70° C. and should be used in lesser proportions than the acetonitrile so that substantially all of the co-solvent may be removed as quickly as possible during the initial stages of the condensation. Particularly satisfactory results have been achieved by employing a co-solvent having a boiling point between about 60° C. and 70° C. and employing the co-solvent and acetonitrile in a ratio of about 1:4 to 1:10 parts by volume. The co-solvent should be a solvent for both the "tailed" naphthol and diacetate intermediate and preferably should be miscible with the acetonitrile to produce a homogeneous reaction solution. Especially useful co-solvents are ethers, for example, diethyl ether, diisopropyl ether, methyl isobutyl ether, ethyl n-propyl ether, methyl n-propyl ether, and preferably, tetrahydrofuran.

The diacetate intermediate and naphthol may be reacted in substantially equimolar proportions. However, when the "tailed" naphthol is a 2-carboxy-1-naphthol, some of the diacetate is lost through side reactions, particularly transacylation. To ensure optimum yields while maintaining unreacted carboxy-naphthol at a level which may be easily separated from the dye precursor, the diacetate and carboxy-naphthol should be reacted in a molar ratio of about 1.2:1.

As discussed previously, substantially all of the co-solvent should be removed from the reaction medium in order to obtain good crystallization of the dye precursor so that it may be recovered in high yields which, typically, are about 90% by weight. Removal of the co-solvent is conveniently achieved by distilling until the boiling point of the reaction medium remains substantially constant. Using this procedure, over 90% of the co-solvent is removed leaving nearly pure acetonitrile.

Of special importance for good performance of the process is conducting the condensation under substantially anhydrous conditions. It has been found that even a small amount of moisture adversely affects the yield of the condensation step. The marked decrease in yield presumably is due to an easy hydrolysis of the diacetate intermediate to the monoacetate,

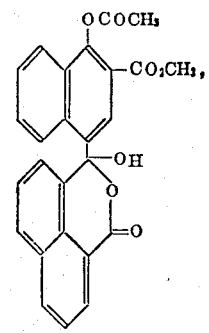

in the presence of moisture. Indeed, the monoacetate was isolated and was shown to be completely unreactive under the conditions of the condensation reaction. The desired level of dryness was achieved by (1) a thorough drying of the equipment, (2) employing a dry co-solvent, e.g., tetrahydrofuran predried over 3-A molecular sieve and (3) using dry acetonitrile containing 0.05 to 0.002% by weight moisture.

Though it is not essential, it is preferred to conduct the condensation reaction under an inert atmosphere, such as, nitrogen to further ensure optimum yields.

Upon cooling, the dye precursor and unreacted starting naphthol crystallize from the reaction solution. Since the efficiency of the subsequent isolation of dye precursor in step (B) tends to vary with the cooling rate, cooling should be controlled at a slow rate. Cooling too fast tends to make the crystallization of the dye precursor less selective.

In step (B), the crude crystalline material obtained upon cooling is separated from the reaction solution, in any suitable and convenient manner, usually by filtration, leaving the reaction by-products in the filtrate.

In step (C), the unreacted starting naphthol which crystallizes out with the dye precursor is then removed in large part by selective recrystallization of the crude material in an appropriate solvent. Suitable solvents include alcohols, such as, isopropanol, or combinations of nitriles with ethers or hydrocarbons, e.g., 1:1 acetonitrile-dimethoxyethane mixture or 1:1 acetonitrile-benzene mixture. Though the dye precursor may be recrystallized a second time before being hydrolyzed, it has been found that a single recrystallization gives material of sufficiently high purity for use in the hydrolysis step. Typically, the one-step purification yields dye precursor approximately 95% pure.

The hydrolysis of step (D) may be carried out in any suitable and convenient manner, for example, by treating the dye precursor of step (C) with an alkaline hydroxide in aqueous or aqueous-organic solution. The alkaline hydroxide may be an alkaline earth hydroxide, such as calcium or barium hydroxide, or preferably, an alkali metal hydroxide, such as sodium or potassium hydroxide. Any water-miscible organic liquid may be used to form the aqueous-organic solution, for example, alcohols, such as ethanol, methanol, isopropanol, or water miscible ethers, for example, 1,2-dimethoxyethane or tetrahydrofuran. It will be appreciated that the carboalkoxy group of the dye precursor also is converted to the free acid group simultaneously with the conversion of the 4'-acetoxy group to a 4'-hydroxy group. Though not essential, it is preferred for ensuring optimum yields to conduct the hydrolysis of step (D) under an inert atmosphere, for example, nitrogen.

As the 1-naphthol starting material for use in step (A), any 1-naphthol possessing an aliphatic substituent as desired for the B radical defined above may be employed provided that the position para to the naphtholic —OH is unsubstituted and thus, free for reaction with the diacetate intermediate. Illustrative of the 2 - carboxy-1-naphthols useful in the preferred embodiment are the alkoxy-substituted 2-carboxy-1-naphthols forming the subject matter of copending U.S. Patent Application Ser. No. 174,171 of Richard B. Greenwald filed Aug. 19, 1971.

The diacetate intermediate employed in step (A) may be prepared by reacting the oxidation product(s) of a 1:1 adduct of naphthaldehydic acid and a 2-carboalkoxy-1-naphthol with an acetylating agent in the presence of an acetylation catalyst, for example, by reacting a dehydro compound, e.g., a 3-(3'-carboalkoxy-4'-oxo-1'-naphthylidene)naphthalide or a ketol compound, e.g., a 3-hydroxy-3-(3'-carboalkoxy-4'-hydroxy - 1' - naphthyl)naphthalide with acetic anhydride in the presence of a strong acid or a base. Preferably, the diacetate intermediate is prepared by reacting acetic anhydride with a ketol compound in the presence of a base, such as, sodium acetate, triethylamine and preferably pyridine. The reaction temperature for the acetylation may vary from room temperature, i.e., about 20° C., up to about 120° C. and ordinarily ranges between about 80° C. and 100° C. The acetic anhydride and ketol compound may be reacted in stoichiometric amounts, but preferably, the acetic anhydride is used in excess. The amount of base may range between about 0.1 to 1.0 equivalent per equivalent of ketol.

The dehydro and ketol compounds employed in the above reaction may be prepared according to the method disclosed and claimed in copending U.S. patent application Ser. No. 108,662 of Alan R. Borror, filed Jan. 21, 1971, by reacting naphthalaldehydic acid and the selected naphthol in the presence of an acid catalyst to form the 1:1 naphthalidylnaphthol adduct. The adduct thus obtained may be oxidized to form the ketol directly or oxidized under anhydrous conditions to form a dehydro intermediate which, upon hydration, yields the ketol. As noted above, the ketol compound preferably is reacted with the acetic anhydride and thus, the product(s) of the above oxidation step are preferably hydrated to ensure complete conversion to the ketol prior to forming the diacetate. The 1-naphthol selected for reaction with the naphthaldehydic acid to form the diacetate intermediate may be 2-carboxy-1-naphthol (1-hydroxy-2-naphthoic acid) or a 2-carboalkoxy-1-naphthol (1-hydroxy-2-alkyl naphthoate), as may be desired.

The ketol compound also may be prepared by other methods. For example, a 3-hydroxy-3-(3'-carboalkoxy-4'-hydroxy-1'-naphthyl)naphthalide may be prepared by forming a complex solution of a 1-hydroxy-2-alkyl naphthoate by reacting the naphthoate with anhydrous aluminum chloride followed by the addition of solvent, such as, nitrobenzene and then reacting the complex solution with 3,3-dichloronaphthalide. This reaction sequence is illustrated below:

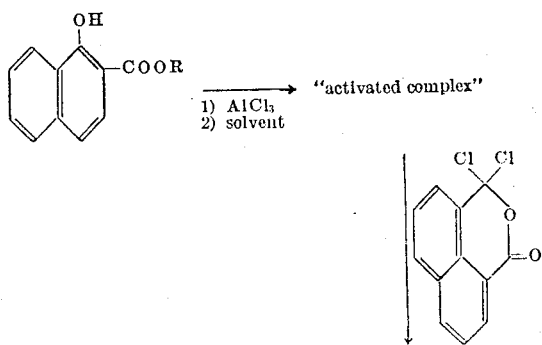

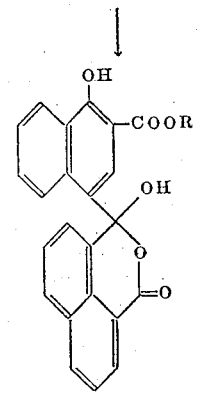

The following example is given to further illustrate the present invention and is not intended to limit the scope thereof.

EXAMPLE

Preparation of the compound of Formula (4)

(A) A solution of 15.54 g. (95.0% pure; 0.030 mole) of 3-acetoxy-3-(3'-carbomethoxy-4'-acetoxy-1'-naphthyl)-naphthalide in 450 ml. of reagent grade acetonitrile (water content not greater than 0.05%) was stirred and heated to boiling in a 3-neck 1000 ml. flask furnished with a nitrogen atmosphere, equipped with a pressure equalizing dropping funnel and fitted with an immersion thermometer and downward distillation apparatus consisting of a simple distillation head and condenser with collection apparatus. A solution of 11.4 g. (0.025 mole) of 2-carboxy-6-octadecyloxy-1-naphthol in 50 ml. of tetrahydrofuran (boiling range 64°–66° C.; water content below 0.02% by weight) prewarmed to 50° C. was added dropwise to the refluxing acetonitrile solution over a seven minute period; the funnel was rinsed with an additional 10 ml. of tetrahydrofuran. The pot temperature dropped from 80° C. to 75° C. and the solvent mixture began distilling at 74° C. Within ten minutes the pot temperature had risen to 78° C. and the boiling point to 77° C. Distillation was continued for 1¼ hour until the pot temperature reached 80.5–81° C. and the boiling point reached 80° C. Most of the tetrahydrofuran was removed during this time. Index of refraction measurements indicated that removal exceeded 85%. Over 250 ml. of solvent was distilled, leaving 310 ml. of nearly pure acetonitrile. To replenish the solvent, 50 ml. of acetonitrile was added after 45 minutes. The distillation apparatus was replaced by a reflux condenser, and the reaction mixture was stirred under reflux for 2 to 2½ hours.

(B) The reaction was then allowed to cool and the dye precursor, 3-(3'-carbomethoxy-4'-acetoxy-1' - naphthyl)-3-(3''-carboxy-4''-hydroxy-6'' - octadecyloxy - 1''-naphthyl)naphthalide along with any remaining 2-carboxy-6-octadecyloxy-1-naphthol crystallized from the reaction mixture. After stirring for 18 hours at room temperature with additional cooling at 5° C. for one hour, the solid was filtered and washed with 50 ml. of acetonitrile. After drying for four hours at 50° C. in a vacuum oven, the solid weighed 19.6 g. (89% by weight yield) and analyzed for 84% purity to give an overall content yield of 75% by weight at this stage.

(C) The crude solid obtained in step (B) 19.5 g., was dissolved in 100 ml. of isopropanol with warming to reflux. The solution was allowed to cool to 25° C. with stirring for 18 hours. The crystalline solid was filtered, washed successively with 50 ml. of isopropanol and 50 ml. of methanol. After drying, the solid weighed 16.1 g. (73% by weight yield); was essentially free of 2-carboxy-6-octadecyloxy-1-naphthol; and analyzed for 96% purity to give an overall yield at this stage of about 70% by weight.

(D) A solution of 7.05 g. (8 m. moles) of the dye precursor of step (C) in 56 ml. of 1,2-dimethoxyethane was heated to reflux under nitrogen. A solution of 7.68 g. of 50% aqueous sodium hydroxide (96 m. moles) in 88 ml. of water was added over 5 minutes and the resulting solution was refluxed under nitrogen for 2 hours. After the heat was removed, acetic acid, 6.4 ml. (104 mmoles) was added over one minute and the clear yellow solution was cooled and filtered (from potential solid contaminants). Dropwise addition over 25 minutes to a stirring mixture of 800 ml. of ice water and 80 ml. of concentrated hydrochloric acid produced a white solid which was filtered, washed with water, and vacuum dried at 60° C. The crude dye product weighed 6.40 g. (97% by weight yield), contained trace impurities by TLC and was 97% pure by visible absorption.

(E) The crude dye product (5.0 g., 97% pure by visible absorption) was dissolved in 7.5 ml. of refluxing tetrahydrofuran stirred under nitrogen. After an additional 10 minutes of stirring under reflux (when all the solid dissolved), 25.0 ml. of n-butyl formate (prewarmed to about 70° C.) and then 17.5 ml. of acetonitrile (also at about 70° C.) were added. The homogeneous solution was stirred and the solvent mixture distilled at atmospheric pressure until a total of 12.5 ml. of distillate was collected. Crystallization occurs during the latter part of the distillation. Heat was removed and the mixture allowed to come to room temperature while stirring was continued for a further 5 hours. The solid was filtered and washed with 20 ml. of ethyl formate. Drying at 65° C. for 3 hours gave 4.55 g. (94% by weight recovery) of colorless solid. The total overall yield of title compound was 64% by weight based on the quantity of 2-carboxy-6-octadecyloxy-1-naphthol starting material in step (A), purity 99–100%. Visible absorption in a 1:4 mixture of ethanol and 6.4N aqueous sodium hydroxide showed a maximum at 649 m$\mu$ and an epsilon of 37,600.

The hydrolysis of the dye precursor obtained in step (C) was repeated with the same results using 7.05 g. of the precursor in 56 ml. isopropanol containing 88 ml. water and 7.68 g. of 50% aqueous sodium hydroxide and refluxing for 2 hours as in step (D) above. After the heat was removed, acetic acid, 6.4 ml., was added over one minute and the clear yellow solution was cooled and filtered (from potential solid contaminants). Dropwise addition over 25 minutes to a stirring mixture of 500 ml. ice water, 100 ml. concentrated hydrochloric acid, and 150 ml. acetic acid produced a white solid which was filtered, washed with water, and vacuum dried at 60° C.

In the final purification, i.e., in the purification of dye product in step (E) above, the butyl formate was used as a selective crystallization medium and the acetonitrile was used as a constituent to induce good crystallization. If desired, esters other than butyl formate, such as ethyl acetate and ethyl formate and ketones, such as acetone and methyl ethyl ketone may be employed as the selective crystallization solvent. Though purifying the dye product by recrystallization in this manner is preferred, purification of the final dye also may be carried out by trituration with hot solvents. For example, the dye product obtained in hydrolysis step (D) also was purified as follows:

The crude product obtained upon hydrolysis in step (D) above, (1.60 g.; 97% pure by visible absorption) was stirred in 8.0 ml. of boiling acetic acid for ¾ hour. Then 8.0 ml. of methanol was added and the solution was filtered while hot. Washing collected solid with methanol followed by vacuum drying at 60° C. produced pure title compound 1.42 g. (92% by weight recovery).

As noted above, the indicator dyes produced in accordance with the present invention are useful as optical filter agents in photographic processes, and because of their relatively high pKa, are particularly useful in diffusion transfer processes employing highly alkaline processing solutions. Their use as optical filter agents in photographic processes is disclosed and claimed in copending U.S. patent application Ser. No. 103,392 of Myron S. Simon and David P. Waller, filed Jan. 4, 1971, now U.S. Pat. No. 3,702,245 issued Nov. 7, 1972. Certain 1-naphthol naphthalides including carboxy-substituted 1-naphthol naphthalides form the subject matter of copending U.S. patent application Ser. No. 103,865 of Myron S. Simon also filed Jan. 4, 1971.

Since certain changes may be made in the above process without departing from the scope of the invention herein involved, it is intended that all matter contained in the above description or shown in the accompanying drawing shall be interpreted as illustrative and not in a limiting sense.

What is claimed is:

1. In a method of preparing a naphthalide indicator dye by reacting (a) a 3 - acetoxy-3-(3'-carboalkoxy-4'-acetoxy-1'-naphthyl)naphthalide and (b) a 1-naphthol in inert organic solution to form the corresponding 3-(3'-carboalkoxy-4'-acetoxy-1'-naphthyl) - 3 - (4''-hydroxy-1''-naphthyl)naphthalide dye precursor and hydrolyzing said 4'-acetoxy group to a hydroxy group to yield the corresponding dye product, the improvement which comprises:

(A) conducting said reaction of (a) and (b) in solution in 1:4 to 1:10 parts by volume of acetonitrile and an inert organic liquid co-solvent having a boiling point not exceeding about 70° C. by heating said solution at reflux under substantially anhydrous conditions and simultaneously removing substantially all of said co-solvent;

(B) isolating said dye precursor from the cooled reaction solution and (C) removing substantially all of the impurities from said dye precursor prior to hydrolyzing said 4'-acetoxy group to a hydroxy group.

2. A method as defined in claim 1 wherein said (a) is 3-acetoxy-3-(3'-carbomethoxy - 4' - acetoxy-1'-naphthyl) naphthalide.

3. A method as defined in claim 2 wherein said (a) and (b) are reacted in a molar ratio of about 1.2:1.

4. A method as defined in claim 3 wherein said (b) is a 2-carboxy-1-naphthol.

5. A method as defined in claim 4 wherein said (b) is 2-carboxy-6-octadecyloxy-1-naphthol.

6. A method as defined in claim 1 wherein said co-solvent is an ether.

7. A method as defined in claim 6 wherein said ether is tetrahydrofuran.

8. A method as defined in claim 1 wherein said co-solvent is removed by distillation.

9. A method as defined in claim 1 wherein substantially all of the impurities are removed from said dye precursor by recrystallization.

10. A method as defined in claim 1 wherein said dye precursor is hydrolyzed with aqueous alkali.

References Cited

Awad et al., J. Org. Chem., vol. 25, 1960, pp. 1872–74.

HENRY R. GILES, Primary Examiner

M. A. M. CROWDER, Assistant Examiner